(12) United States Patent
Schoor et al.

(10) Patent No.: US 10,012,726 B2
(45) Date of Patent: Jul. 3, 2018

(54) RAPID-CHIRPS-FMCW RADAR

(71) Applicant: Robert Bosch GmbH, Stuttgart (DE)

(72) Inventors: Michael Schoor, Stuttgart (DE); Christoph Schroeder, Pleidelsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 258 days.

(21) Appl. No.: 14/443,296

(22) PCT Filed: Sep. 25, 2013

(86) PCT No.: PCT/EP2013/069912
§ 371 (c)(1),
(2) Date: May 15, 2015

(87) PCT Pub. No.: WO2014/075838
PCT Pub. Date: May 22, 2014

(65) Prior Publication Data
US 2015/0331096 A1    Nov. 19, 2015

(30) Foreign Application Priority Data

Nov. 15, 2012    (DE) .................. 10 2012 220 879

(51) Int. Cl.
*G01S 13/93* (2006.01)
*G01S 13/58* (2006.01)
(Continued)

(52) U.S. Cl.
CPC ............. *G01S 13/584* (2013.01); *G01S 7/35* (2013.01); *G01S 13/343* (2013.01); *G01S 13/345* (2013.01)

(58) Field of Classification Search
CPC .................................. G01S 13/584; G01S 7/35
(Continued)

(56) References Cited

U.S. PATENT DOCUMENTS 5,963,163 A  * 10/1999 Kemkemian ........... G01S 13/34
                                                              342/109
6,023,238 A  *  2/2000 Cornic .................. G01S 13/348
                                                              342/107
(Continued)

FOREIGN PATENT DOCUMENTS

CN    102680967 A    9/2012
CN    102741704 A    10/2012
(Continued)

OTHER PUBLICATIONS

Monod, et al. "Intertwined Linear Frequency Modulated Radar and Simulator for Outdoor Robotics Applications", 2014), https://www.researchgate.net/profile/Raphael_Rouveure/publication/297380837, pp. 1-5. (Year: 2014).*
(Continued)

*Primary Examiner* — Marcus E Windrich
(74) *Attorney, Agent, or Firm* — Norton Rose Fulbright US LLP; Gerard Messina

(57) ABSTRACT

Method for determining distances and relative velocities of simultaneously located objects using an FMCW radar, in which the frequency of a transmission signal is modulated in the form of periodically recurring ramps, the transmission signal is mixed with a received signal to form an intermediate frequency signal and, for determining the distance and/or the relative velocity of the objects, the change in the phase of the intermediate frequency signal is evaluated from one ramp to the next characterized in that the modulation pattern includes at least two ramps, which differ only by a fixed frequency offset and follow one another in a certain time interval, and an unambiguous approximate value is calculated for the object distance on the basis of the phase difference $\varphi_1-\varphi_2$ of the intermediate frequency signals for these two ramps.

4 Claims, 5 Drawing Sheets

(51) Int. Cl.
*G01S 7/35* (2006.01)
*G01S 13/34* (2006.01)

(58) Field of Classification Search
USPC .................................................. 342/70–72
See application file for complete search history.

(56) References Cited

U.S. PATENT DOCUMENTS

| | | | | |
|---|---|---|---|---|
| 7,724,181 | B2* | 5/2010 | Natsume | G01S 13/426 |
| | | | | 342/103 |
| 7,932,855 | B2* | 4/2011 | Uebo | G01S 13/32 |
| | | | | 342/118 |
| 8,077,076 | B2* | 12/2011 | Walter | G01S 13/345 |
| | | | | 342/118 |
| 8,390,506 | B2* | 3/2013 | Focke | G01S 13/345 |
| | | | | 342/112 |
| 2005/0225481 | A1* | 10/2005 | Bonthron | G01S 7/032 |
| | | | | 342/175 |
| 2010/0289692 | A1* | 11/2010 | Winkler | G01S 7/4008 |
| | | | | 342/70 |

FOREIGN PATENT DOCUMENTS

| | | |
|---|---|---|
| DE | 102009000468 | 8/2009 |
| DE | 102009047931 | 4/2011 |
| EP | 1918736 | 5/2008 |
| WO | WO02/31529 | 4/2002 |
| WO | WO03/048802 | 6/2003 |

OTHER PUBLICATIONS

Monod, et al. "Intertwined Linear Frequency Modulated Radar and Simulator for Outdoor Robotics Applications", 2014), https://www.researchgate.net/profile/Raphael_Rouveure/publication/297380837, pp. 1-5. (Year: 2014).*

Li Su, et al. "2-D FFT and Time-Frequency Analysis Techniques for Multi-Target Recognition of FMCW Radar Signal", Microwave Conference Proceedings, 2011 Asia-Pacific , pp. 1390-1393.

International Search Report for PCT/EP2013/069912, dated Jan. 22, 2014.

Monod, et al. "Intertwined Linear Frequency Modulated Radar and Simulator for Outdoor Robotics Applications", (2015), https://www.researchgate.net/profile/Raphael_Rouveure/publication/297380837, pp. 1-5.

* cited by examiner

RAPID-CHIRPS-FMCW RADAR

FIELD OF THE INVENTION

The present invention relates to a method for determining distances and relative velocities of multiple simultaneously located objects using an FMCW radar, in which the frequency of a transmission signal is modulated in the form of periodically recurring ramps, the transmission signal is mixed with a received signal to form an intermediate frequency signal and, for determining the distance and/or the relative velocity of the objects, the change of the phase of the intermediate frequency signal is evaluated from one ramp to the next.

In addition, the present invention relates to a radar sensor, in particular for motor vehicles, which is configured to carry out this method.

BACKGROUND INFORMATION

FMCW radar sensors are used in motor vehicles to detect the traffic surroundings, in particular for locating other vehicles. The location results may be used for various assistance functions, for example, for adaptive cruise control, an automatic collision warning or also the automatic triggering of an emergency braking operation in the event of an imminent collision risk.

The frequency of the intermediate frequency signal corresponds to the frequency difference between the signal sent at a given point in time and the signal received at the same point in time. Due to the frequency modulation of the transmission signal, this frequency difference depends on the transit time of the signal from the radar sensor to the object and back and thus on the distance of the object. However, due to the Doppler Effect, the frequency difference also includes a component, which is due to the relative velocity of the object. The measurement of the frequency difference on a single ramp therefore does not yet allow a determination of the distance and the relative velocity, but instead yields only a linear relationship between these variables. This relationship is represented as a straight line in a distance/velocity diagram (R-v diagram).

To obtain unambiguous values for the distance and the relative velocity, a conventional type of FMCW radar works with alternating rising and falling frequency ramps. In the R-v diagram, this then yields a different straight line for each ramp, the distance and the relative velocity of the object being defined by the point of intersection of these two straight lines.

However, when several objects are located simultaneously, the frequency spectrum of the intermediate frequency signal contains multiple peaks on each ramp, one for each object, and when the peaks on different ramps are compared, it is no longer possible to ascertain unambiguously which peak belongs to which object. For example, with simultaneous location of two objects, an R-v diagram having four intersecting straight lines is obtained. Only two of the four points of intersection yield the distances and relative velocities of the two objects, while the two other points of intersection represent so-called "phantom targets."

To eliminate this ambiguity, at least one third frequency ramp, which has a different slope and a different set of straight lines in the R-v diagram, is used in most cases. The true objects may then be recognized by the fact that all three straight lines pass through the same point.

However, with an increase in the number of simultaneously located objects, there is a drastic increase in the probability that three straight lines will intersect randomly at almost the same point, whereby the effort also increases to resolve the ambiguities. Additional frequency ramps are often used to resolve ambiguities more easily.

The method described in the introductory paragraph represents an alternative approach to solving this problem. This method works with a series of identical, relatively short frequency ramps, so-called "rapid chirps," which have a high frequency deviation in relation to their duration, and therefore are so steep that the distance-dependent component is dominant in the intermediate frequency signal, while the Doppler component represents only a minor correction. This correction is determined by the fact that the phase change of the intermediate frequency signal is monitored from one ramp to the next. This makes use of the circumstance that the phase of the intermediate frequency signal has a relatively sensitive response to the minor change in the object distance which results from the relative movement of the object during the short time interval from one frequency ramp to the next.

However, since the phase change is a periodic function of the relative velocity, the relative velocity may be determined unambiguously only when it is so small that the phase change amounts to less than half a period (i.e., less than $\pi$).

However, when using an FMCW radar in a motor vehicle, the relative velocities may be so high that this condition is violated. To nevertheless obtain unambiguous results, the duration and thus the repeat frequency of the chirps would have to be shortened further. However, this would not only require more computation power but would also entail a greater fuzziness in the distance measurement due to the shorter "observation period" accordingly and ultimately no measurement at all would be possible if the ramp duration is shorter than the time required for the radar signal to travel to the object and back.

SUMMARY

An object of the present invention is therefore to provide a method, which will make it possible to measure distances and relative velocities unambiguously and with high precision.

This object is achieved according to the present invention by the fact that the modulation pattern includes at least two ramps, which differ only by a fixed frequency offset and which follow one another in a certain time interval and that an unambiguous approximate value for the object distance is calculated on the basis of the phase difference in the intermediate frequency signals for these two ramps.

The present invention makes use of the circumstance that the phase difference of the intermediate frequency signals for the two frequency-offset ramps is almost independent of the relative velocity of the object when there is a short time interval between the two ramps and therefore it supplies a good approximate value for the object distance. A more accurate value for the object distance may then be determined according to one of the known methods, which supply ambiguous results. The approximate value determined on the basis of the phase difference then makes it possible to select the correct value for the object distance from the multiple accurate values to be considered.

DETAILED DESCRIPTION

Figure 1:
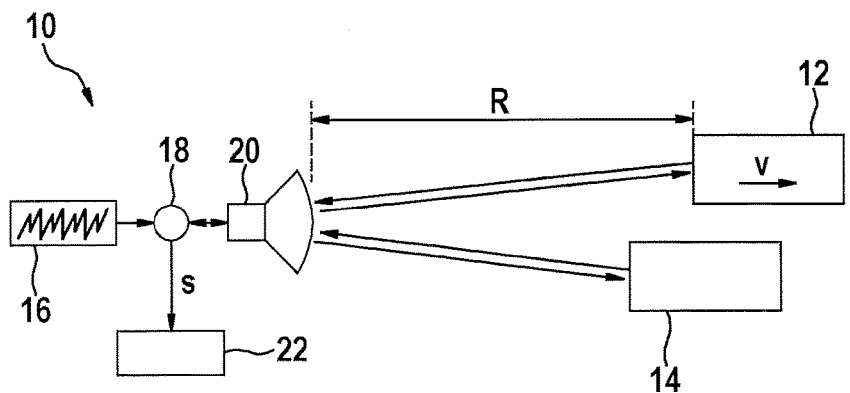
FIG. 1 shows a block diagram of an FMCW radar system.

FIG. 1 shows as a simplified block diagram of an FMCW radar sensor 10, which is installed at the front of a motor vehicle, for example, and serves to measure distances R and relative velocities v of objects 12, 14, for example, of preceding vehicles. Radar sensor 10 has a voltage-controlled oscillator 16, which supplies a frequency-modulated transmission signal via a mixer 18 to a transceiver unit 20, which emits the signal in the direction toward objects 12, 14. The signal reflected on the objects is received by transceiver unit 20 and is mixed with a component of the transmission signal in mixer 18. An intermediate frequency signal s, which is analyzed further in an electronic evaluation and control unit 22, is obtained in this way.

Figure 2:
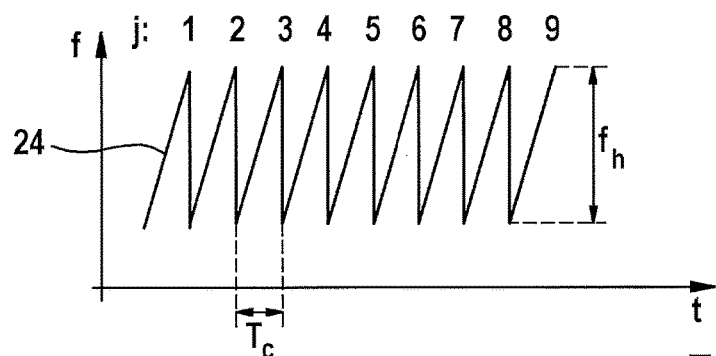
FIG. 2 shows an example of a frequency modulation scheme.

FIG. 2 shows an example of a modulation scheme of the transmission signal supplied by oscillator 16. Frequency f of the transmission signal is plotted here as a function of time t. The frequency is modulated in the form of successive identical ramps 24. Ramps 24 are numbered continuously in FIG. 2 with an index j. The mean frequency of the transmission signal is on the order of magnitude of 76 GHz, and frequency deviation $f_h$ by which the frequency changes in the course of each ramp is of the order of magnitude of a few MHz. Time interval $T_c$, in which ramps 24 follow one another successively, is on the order of magnitude of a few microseconds up to a few milliseconds. Since in the example shown here, ramps 24 follow one another without a pause, $T_c$ indicates the ramp duration at the same time.

The frequency of intermediate frequency signal s corresponds to the frequency difference between the transmission signal, which is relayed by mixer 18 to transceiver unit 20, and the signal which was received by transceiver unit 20 after being reflected on objects 12, 14 and again arrives at mixer 18. This frequency difference is additively made of a distance-dependent component $f_R$ and a velocity-dependent component $f_v$. Distance-dependent component $f_R$ results from the frequency modulation and is given in the example shown here by:

$$f_R = 2Rf_h/cT_c \quad (1)$$

where c is the velocity of light. The velocity-dependent component results from the Doppler effect and is given approximately by:

$$f_\alpha = 2fv/c, \quad (2)$$

Figure 3A:
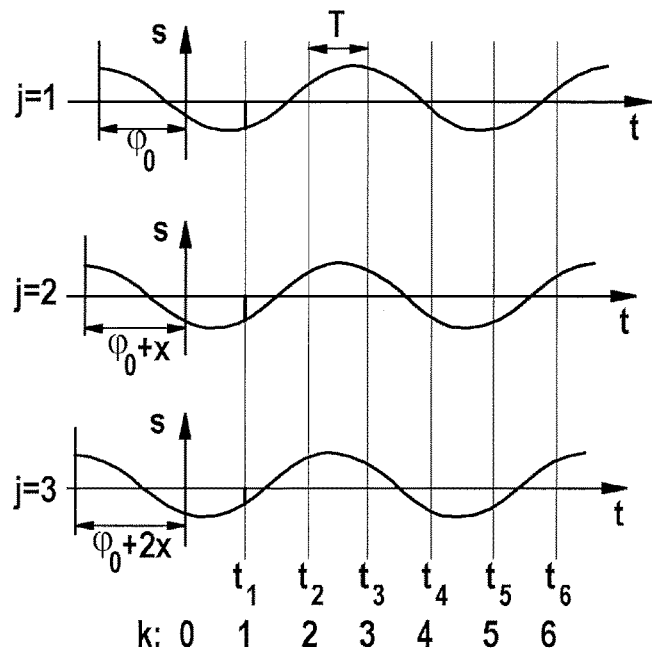
FIG. 3 shows a series of intermediate frequency time signals as well as their Fourier transforms.

FIG. 3(A) shows intermediate frequency signals s for the first three ramps j=1 through j=3 as a function of time t (time signals) under the assumption that only one single object is located. In evaluation and control unit 22, the time signal, which is supplied as an analog signal by mixer 18, is sampled, digitized and stored periodically at sampling points in time $t_1$, $t_2$ . . . . The sampling points in time are synchronized with the modulation ramps of the transmission signal and are numbered with index k within each ramp. The sampling period, i.e., the time interval between the individual sampling points in time, is labeled as T.

Figures 3B, 3C:
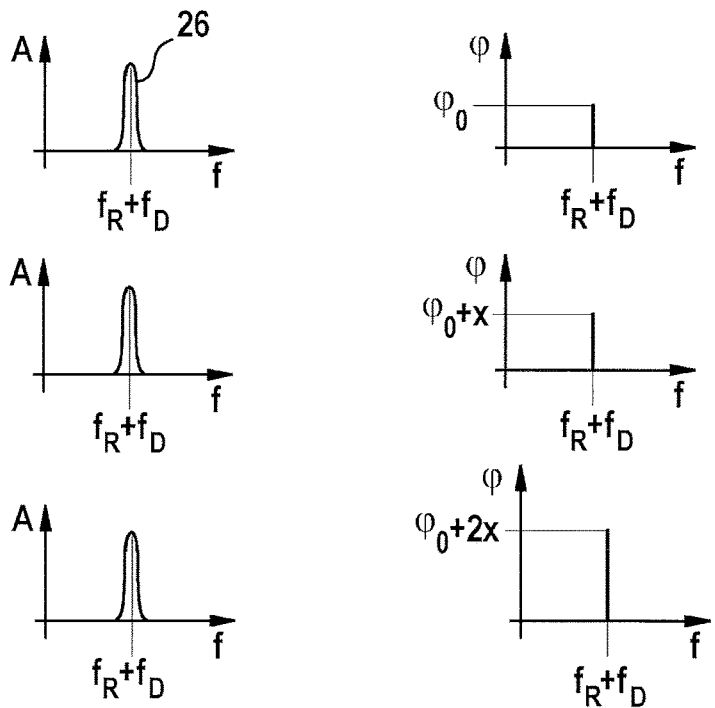

The time signal for each ramp may be converted by a fast Fourier transform (FFT) into a spectrum, which indicates the (complex) amplitude of the intermediate frequency signal as a function of frequency f. Two small diagrams indicating absolute amount A and phase φ as a function of frequency f are shown in FIGS. 3(B) and (C) for each of the three ramps.

Under the assumption that only one single object is present, the spectrum recorded on a single ramp has a sharp peak 26 at frequency $f_R+f_D$. Frequencies $f_R+f_D$ remain practically unchanged due to the small time interval $T_c$ of the ramps, so that peak 26 is in the same location in all three spectra shown in FIG. 3(B).

If the relative velocity of the object is not equal to 0, then the minor distance change of the object occurring within ramp duration $T_c$ leads to a phase shift of the intermediate frequency signal, as shown in FIG. 3. From one ramp to the next, the phase increases by a certain amount x. If $\varphi_0$ denotes the phase on the first ramp (j=1), then the phase on the second ramp (j=2) has the value $\varphi_0+x$ and the phase on the third ramp (j=3) has the value $\varphi_0+2x$.

In general, intermediate frequency signal s is described as follows as a function of sampling index k and ramp index j:

$$s(k,j) = R_0(\exp(1((\varphi_0 + 2\pi)f_R + f_D)kT + 2\pi f_D j\, T_c))) \quad (3)$$

The term $(f_R+f_D)kT$ represents the transit time and Doppler effects within a single ramp. The term $f_D j T_c$ represents the effect of the minor change in the object distance from one ramp to the next and depends only on velocity-dependent component $f_D$ (of the Doppler frequency). Value $\varphi_0$ is a phase offset which is given by the equation $$\varphi_0 = 4\pi R\, f_0/c \quad (4)$$

where $f_0$ is the center frequency of the frequency ramps.

If, similar to FIG. 3, a Fourier transform is carried out only within a single ramp (over index k with fixed j), then the term $f_D j T_c$ in equation (3) yields only a contribution x, 2x, . . . to the phase.

Figure 4A:
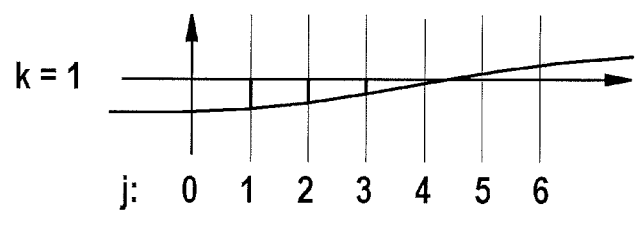
FIG. 4 shows a longitudinal section of the time signals according to FIG. 3 as well as the Fourier transform of this longitudinal section.
Figure 4B:
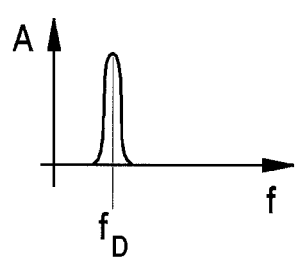
Figure 4C:
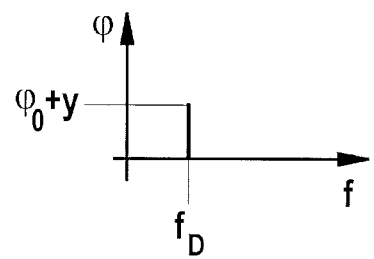

However, a Fourier transform may also be carried out over a "longitudinal section" of the time signals by keeping the sampling index k and carrying out the fast Fourier transform over the running ramp index j. In FIGS. 3 and 4, this is shown as symbolic of the sampling index k=1. In FIG. 3 the function values at sampling point in time $t_1$ are represented as thick bars. The same bars are also shown in FIG. 4(A). However, in this case they are plotted as a function of ramp index j. Due to the phase offset from one ramp to the next, a periodic function, which may be subjected to a Fourier transform, is again obtained. The result is again shown as a diagram for absolute amount A and phase φ of the complex amplitude in FIGS. 4(B) and (C). These Fourier transforms, which may be carried out for each k, then yield a sharp peak at Doppler frequency $f_D$ for one single object. The phase is made up of phase offset $\varphi_0$ and a component $y(=f_R+f_D)kT$.

Only frequency components $f_R$ and $f_D$ are needed for calculation of distance R and relative velocity v of the object. As shown in FIG. 4, the spectra obtained by the Fourier transform over ramp index j yield frequency component $f_D$, while the Fourier transform within each individual ramp yields the sum $f_R+f_D$ of the frequency components according to FIG. 3. Frequency component $f_R$ and thus distance R may then be calculated from the two variables together.

Figure 5:
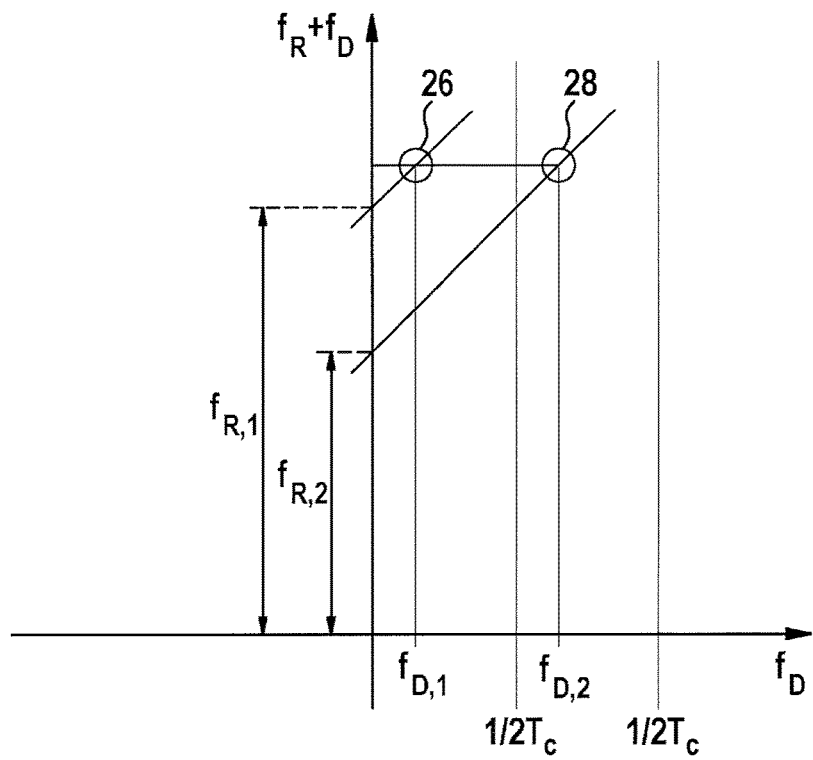
FIG. 5 shows a diagram to illustrate the results of a two-dimensional Fourier transform.

A particularly elegant evaluation method is one in which the Fourier transforms described above are combined into a so-called two-dimensional Fourier transform. In this method, the time signals obtained on multiple successive ramps are transformed into a two-dimensional frequency space, whose coordinates are Doppler frequency $f_D$ and sum $f_R+f_D$, as shown in FIG. 5. In this two-dimensional frequency space, peak 26 is in a position $f_{D,1}$ on the horizontal axis, which corresponds to the Doppler frequency and thus to relative velocity v of the object, and its position on the vertical axis is $f_{R,1}+f_{D,1}$. In this diagram, the peaks of objects having the same distance ($f_R$ constant) but different relative velocities ($f_D$ variable) lie on 45° lines. Where the 45° straight line, which passes through peak 26, intersects the vertical axis, distance-dependent frequency component $f_{R,1}$ may be read directly and converted into a corresponding distance $R_1$.

Figure 6:
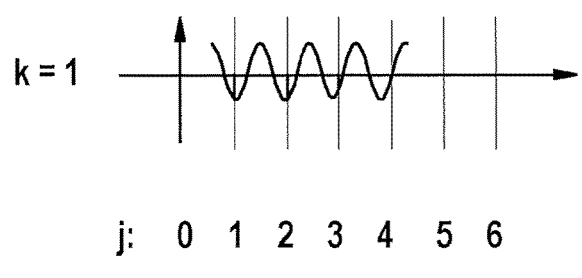
FIG. 6 shows a longitudinal section analog to that in FIG. 4 for a different relative velocity.

However, the method described so far presupposes that the unambiguity condition:

$$|f_D|<1/2T_c \quad (5)$$

is met according to Shannon's sampling theorem for Doppler frequency $f_D$. At higher relative velocities and higher Doppler frequencies $f_D$ accordingly, the periodic function given by the discrete function values at j=1, j=2, etc. in FIG. 4(A) may no longer be determined unambiguously. As an example, FIG. 6 shows a periodic function, which has the same function values at j=1, j=2 and j=3 as in FIG. 4(A) but has a much higher frequency and therefore would represent an object having a significantly higher relative velocity. As long as the true relative velocity of the object is unknown, one must therefore expect the possibility that the object is not represented by peak 26 in FIG. 5 but instead by a peak 28 and a higher Doppler frequency $f_{D,2}$, which lies outside of the unambiguity corridor. Another object distance $R_2$, which is determined by frequency $f_{R,2}$ in FIG. 5, would then also belong to this peak.

Likewise, the longitudinal section of the intermediate frequency signal may also be any higher harmonic of the function shown in FIG. 6, each indicating another possible even higher relative velocity of the object.

If the relative velocity of the object is negative, then the intermediate frequency signals in FIG. 3 are shifted to the other side, which would be represented by a negative Doppler frequency $f_D$ in the Fourier transform. In this case, the object could also be represented by peaks located in corresponding positions left of the ($f_R+f_D$) axis in FIG. 5. In any case, if the range of relative velocities in question cannot be adequately restricted, the measurement yields a set of possible peak positions and corresponding value pairs $f_D$, $f_R$, whose values may be calculated precisely, but of which it is not known which value pair represents the true object.

Therefore, a method which permits a selection of the correct value pair is needed.

Figure 7:
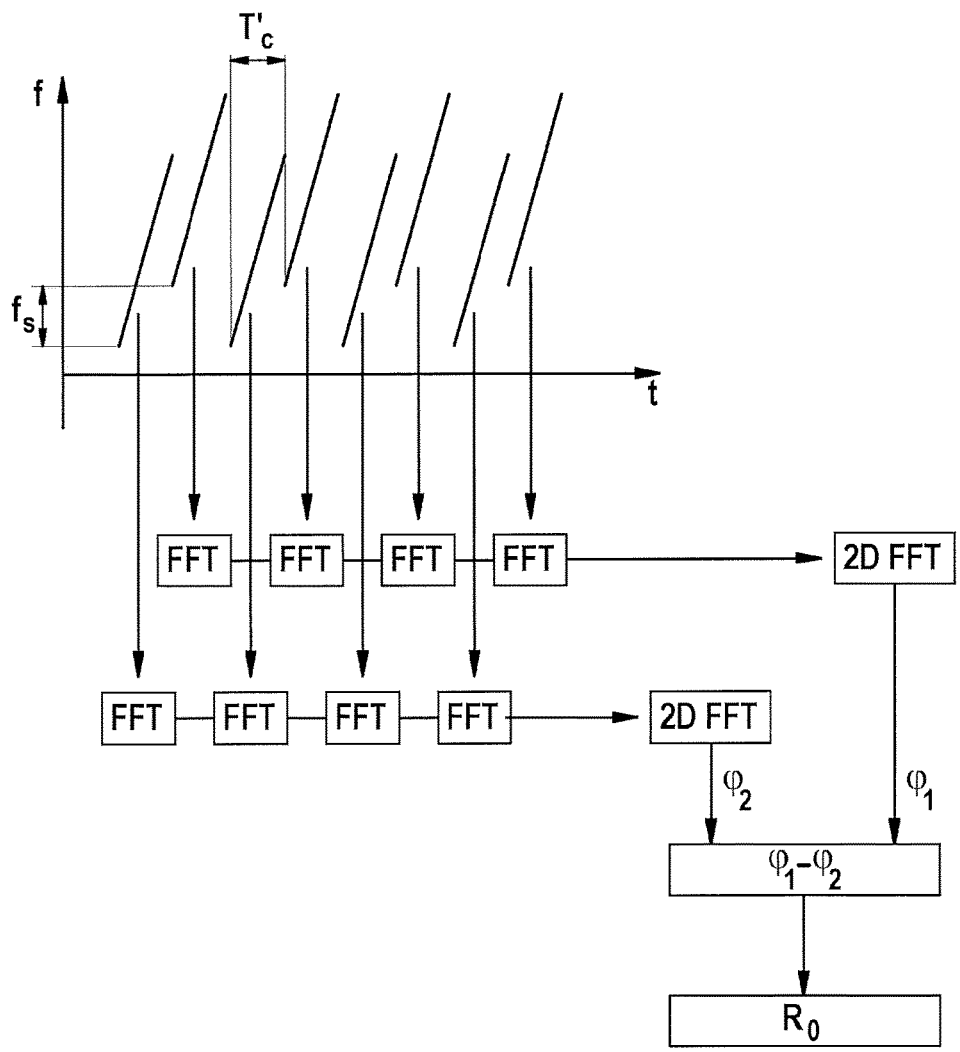
FIG. 7 shows a diagram to illustrate the method according to the present invention.

For this purpose, instead of the modulation scheme shown in FIG. 2, a modulation scheme shown in FIG. 7 is used. In this modulation scheme, two series of ramps 24, 30 are interconnected in such a way that a frequency offset ramp 30 follows on a ramp 24 having a time interval $T'_c$ and then is followed by the next ramp 24 without a frequency offset, etc. Ramps 24 and 30 have the same duration and the same frequency deviation but are shifted by a fixed interval $f_s$ relative to one another. The individual ramps or ramp pairs 24, 30 may optionally each be separated by a pause. In the example shown here, the ramps follow one another without a pause, so that time interval $T'_c$ is again equal to ramp duration $T_c$.

The evaluation procedure described on the basis of FIGS. 1 through 6 may now be carried out once for the set of ramps 24 and once again for the set of ramps 30. Intermediate frequency signals s thereby obtained differ mainly in their phase offset. For first ramp 24, the phase offset according to equation (4) is given by:

$$\varphi_1=4\pi R_0 f_1/c \quad (6)$$

where $R_0$ is the distance of the object at the point in time at which the signal of the first ramp is received and $f_1$ is the center frequency of ramp 24.

For first offset ramp 30, this yields the phase offset accordingly:

$$\varphi_2=4\pi(R_0+T'_c v)f_2/c \quad (7)$$

where $f_2$ is the center frequency of ramp 30. Term $T'_c v$ represents the increase in the object distance in time interval $T'_c$ from the start of first ramp 24 up to the start of first ramp 30. This then yields for the phase difference:

$$\varphi_2-\varphi_1=4\pi(R_0 f_x+T'_c v f_x+T'_c v f_1)/c \quad (8)$$

Since $T'_c$ is very small, the term containing $R_0$ is dominant and the terms containing $T'_c v$ may be disregarded:

$$\varphi_2-\varphi_3=4\pi R_0 f_x/c \quad (9)$$

This equation yields an approximate value $R_0$ for the object distance, which does not depend on relative velocity v.

As represented symbolically in FIG. 7, the time signals obtained for the set of ramps 24 are subjected to a two-dimensional fast Fourier transform (2D FFT), equivalent to Fourier transforms over the individual ramps and corresponding Fourier transforms over longitudinal sections through the time signals from various ramps. This yields peak 26 in FIG. 5 and also phase $\varphi_1$ of the intermediate frequency signal (from the complex amplitude at the site of peak 26). A similar procedure is followed with the set of ramps 30, thus yielding phase $\varphi_2$ in this way.

Then according to the equation (9) stated above, approximate value $R_0$ may then be calculated from phase difference $\varphi_1-\varphi_2$.

This approximate value $R_0$ is then compared with possible distance values $R_1$, $R_2$ which belong to frequency values $f_{R,1}$, $f_{R,2}$, etc., shown in FIG. 5. The one of these possible distances $R_1$, $R_2$, ... coming closest to approximate value $R_0$ is then considered as the value for the true distance of the object. Doppler frequency $f_D$ and, from that, true relative velocity v of the object, may then be determined from the position of corresponding peaks 26 or 28 in FIG. 5.

The ambiguity, which would exist in the evaluation of just one of the sets of ramps 24, 30, is eliminated in this way.

If multiple objects are located simultaneously, this yields exactly one peak 26 within the unambiguity interval of −1/2T, to +1/2T, for each object, so that ambiguities based on the assignment of the peaks to the objects are also avoided.

However, the method described here for determining approximate value $R_0$ in turn leads to ambiguities when the object distance is so great that the phase difference $\varphi_2-\varphi_1$ is greater than $2\pi$. This yields a limit for the maximum measurable distance:

$$R_{MAX}=C/2f_s \quad (10)$$

Frequency offset $f_s$ should therefore be selected to be so (small) that the desired distance range is covered.

In practice, the relative velocities of the objects in question are within a limited interval. According to FIG. 5, this also limits the interval in which the object distances in question must be located. Consequently, $f_s$ may be selected to be so large that the approximate value for the distance is unambiguous only within the distance range actually required.

There is optionally also the possibility of varying the frequency offset $f_s$ in the course of the successive measuring cycles in order to vary the unambiguity range temporarily—as a function of demand, if necessary—and/or to obtain additional information for different frequency offsets by evaluating the phase differences.

What is claimed is:

1. A method for determining distances and relative velocities of multiple simultaneously located objects using an FMCW radar, the method comprising:
   modulating, via a modulator, a frequency of a transmission signal in the form of a modulating pattern that includes periodically recurring ramps;
   mixing, via a mixer, the transmission signal with a received signal to form intermediate frequency signals;
   evaluating, via an evaluation unit, to determine at least one of a distance and a relative velocity of the objects, a phase difference corresponding to a change in a phase of the intermediate frequency signals from one ramp to a next one, wherein the modulation pattern includes at least two ramps that differ only by a fixed frequency offset and follow one another in a time interval, and
   calculating an unambiguous approximate value for the distance based on the phase difference of the intermediate frequency signals for the at least two ramps;
   wherein the modulation pattern includes two sets of ramps that are identical to one another and are interlinked so that one ramp without a frequency offset alternates with one ramp having a frequency offset, wherein the ramps are offset by a fixed frequency offset and are successive in time,
   wherein the intermediate frequency signals of a two-dimensional Fourier transform obtained in successive identical ramps are subjected to a two-dimensional Fourier transform to determine corresponding frequencies, including a first frequency and a second frequency, and corresponding phases, including a first phase and a second phase,
   wherein an approximate object distance is determined from the phase difference, and
   wherein the approximate object distance is compared with distance values associated with the first frequency and the second frequency, and the distance value closest to the approximate object distance is determined to be a true distance of the object.

2. The method as recited in claim 1, wherein a plurality of object distances to be considered is calculated by evaluating the intermediate frequency signals of multiple successive identical ramps, and wherein one of the calculated distances which comes closest to the approximate value is selected as a final object distance.

3. An FMCW radar sensor, comprising:
   a control and evaluation unit for determining distances and relative velocities of multiple simultaneously located objects using an FMCW radar, by performing the following:
   modulating a frequency of a transmission signal in the form of a modulating pattern that includes periodically recurring ramps,
   mixing the transmission signal with a received signal to form intermediate frequency signals,
   evaluating, to determine at least one of a distance and a relative velocity of the objects, evaluating a phase difference corresponding to a change in a phase of the intermediate frequency signals from one ramp to a next one, wherein the modulation pattern includes at least two ramps that differ only by a fixed frequency offset and follow one another in a time interval, and
   calculating an unambiguous approximate value for the distance based on the phase difference of the intermediate frequency signals for the at least two ramps;
   wherein the modulation pattern includes two sets of ramps that are identical to one another and are interlinked so that one ramp without a frequency offset alternates with one ramp having a frequency offset, wherein the ramps are offset by a fixed frequency offset and are successive in time,
   wherein the intermediate frequency signals of a two-dimensional Fourier transform obtained in successive identical ramps are subjected to a two-dimensional Fourier transform to determine corresponding frequencies, including a first frequency and a second frequency, and corresponding phases, including a first phase and a second phase,
   wherein an approximate object distance is determined from the phase difference, and
   wherein the approximate object distance is compared with distance values associated with the first frequency and the second frequency, and the distance value closest to the approximate object distance is determined to be a true distance of the object.

4. The FMCW radar sensor as recited in claim 3, wherein a plurality of object distances to be considered is calculated by evaluating the intermediate frequency signals of multiple successive identical ramps, and wherein one of the calculated distances which comes closest to the approximate value is selected as a final object distance.

* * * * *